Sheet 1. 3 Sheets

S. F. B. Morse.
Telegraph Signs.

Nº 1,647.                                    Patented Jan. 20, 1840.

Example 1st                                  1st For Numerals

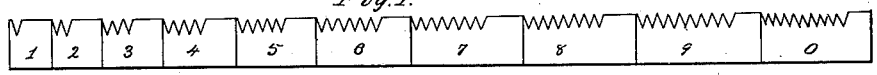
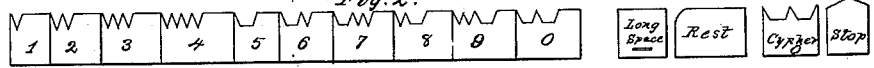

Example 2d    For Compound Numerals
Showing the numerals combined together

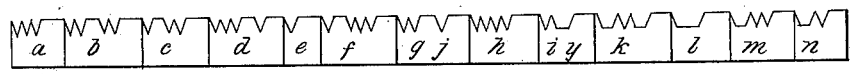
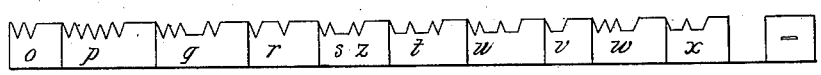

Figure 1:
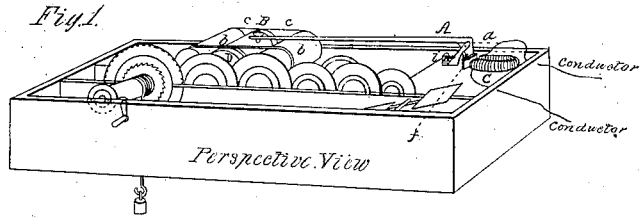

Example 3d                                   2d For Letters a  b  c  d  e  f  gj  h  iy  k  l  m  n  o  p
q  r  sz  t  u  v  w  x The System of Type Example 4th                                  1st For Numerals Fig. 1.
| 1 | 2 | 3 | 4 | 5 | 6 | 7 | 8 | 9 | 0 |

Figure 2:
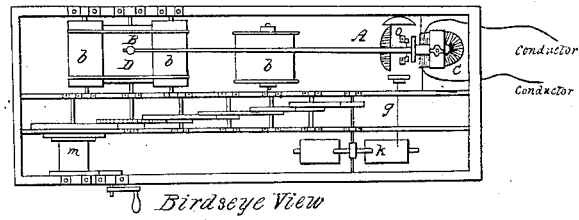

Fig. 2.
| 1 | 2 | 3 | 4 | 5 | 6 | 7 | 8 | 9 | 0 | Long Space | Rest | Cypher | Stop |

Example 5                                    2d For Letters

| a | b | c | d | e | f | gj | h | iy | k | l | m | n |
| o | p | q | r | sz | t | w | v | w | x | — |

Example 6.    Type for circular Port Rule

Fig. 1.
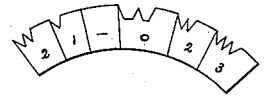
Fig. 2.

Figure 3:
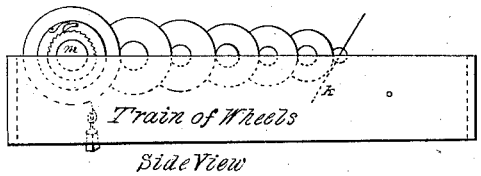

Fig. 3.

Witnesses
Thomas Clark
Alexr Jackson

Inventor
Saml. F. B. Morse

Sheet 2. 3 Sheets.
S. F. B. Morse.
Telegraph Signs.
N°.1,647.    Patented Jun. 20, 1840.
Example. 7.
Type Rule.
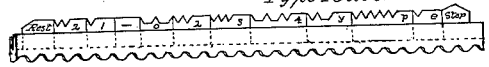
Example. 8.
Straight Port Rule
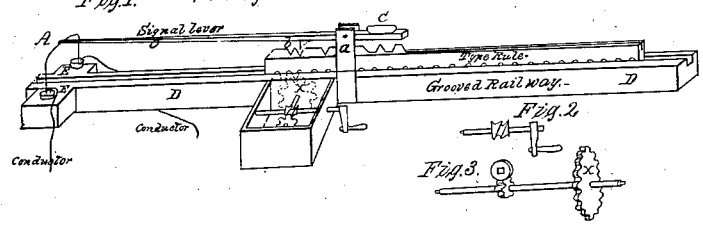
Example. 9.
Circular Port Rule.
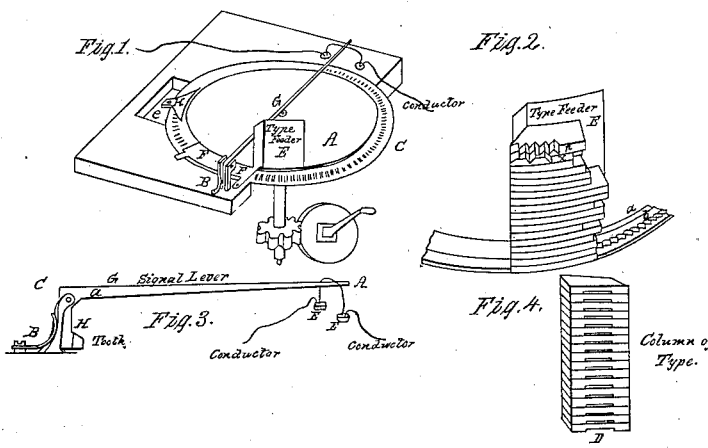
Witnesses.
J. Thomas Clark
Alexr. Jackson
Inventor
Saml. F. B. Morse S. F. B. Morse.
Telegraph Signs.

No 1,647.  Patented Jun. 20, 1840.

Example 10.
Register

Perspective View

Birdseye View

Train of Wheels
Side View

Witnesses.
J. Thomas Clark
Henr. Jackson

Inventor
Sam. F. B. Morse

UNITED STATES PATENT OFFICE.

SAMUEL F. B. MORSE, OF NEW YORK, N. Y.

IMPROVEMENT IN THE MODE OF COMMUNICATING INFORMATION BY SIGNALS BY THE APPLICATION OF ELECTRO-MAGNETISM.

Specification forming part of Letters Patent No. 1,647, dated June 20, 1840.

*To all whom it may concern:*

Be it known that I, the undersigned, SAMUEL F. B. MORSE, of the city, county, and State of New York, have invented a new and useful machine and system of signs for transmitting intelligence between distant points by the means of a new application and effect of electro-magnetism in producing sounds and signs, or either, and also for recording permanently by the same means, and application, and effect of electro-magnetism, any signs thus produced and representing intelligence, transmitted as before named between distant points; and I denominate said invention the "American Electro-Magnetic Telegraph," of which the following is a full and exact description, to wit:

It consists of the following parts—first, of a circuit of electric or galvanic conductors from any generator of electricity or galvanism and of electro-magnets at any one or more points in said circuit; second, a system of signs by which numerals, and words represented by numerals, and thereby sentences of words, as well as of numerals, and letters of any extent and combination of each, are communicated to any one or more points in the before-described circuit; third, a set of type adapted to regulate the communication of the above mentioned signs, also cases for convenient keeping of the type and rules in which to set and use the type; fourth, an apparatus called the "straight port-rule," and another called the "circular port-rule," each of which regulates the movement of the type when in use, and also that of the signal-lever; fifth, a signal-lever which breaks and connects the circuit of conductors; sixth, a register which records permanently the signs communicated at any desired points in the circuit; seventh, a dictionary or vocabulary of words to which are prefixed numerals for the uses hereinafter described; eighth, modes of laying the circuit of conductors.

The circuit of conductors may be made of any metal—such as copper, or iron wire, or strips of copper or iron, or of cord or twine, or other substances—gilt, silvered, or covered with any thin metal leaf properly insulated and in the ground, or through or beneath the water, or through the air. By causing an electric or galvanic current to pass through the circuit of conductors, laid as aforesaid, by means of any generator of electricity or galvanism, to one or more electro-magnets placed at any point or points in said circuit, the magnetic power thus concentrated in such magnet or magnets is used for the purposes of producing sounds and visible signs, and for permanently recording the latter at any and each of said points at the pleasure of the operator and in the manner hereinafter described—that is to say, by using the system of signs which is formed of the following parts and variations, viz:

Signs of numerals consist, first, of ten dots or punctures, made in measured distances of equal extent from each other, upon paper or any substitute for paper, and in number corresponding with the numeral desired to be represented. Thus one dot or puncture for the numeral 1, two dots or punctures for the numeral 2, three of the same for 3, four for 4, five for 5, six for 6, seven for 7, eight for 8, nine for 9, and ten for 0, as particularly represented on the annexed drawing marked Example 1, Mode 1, in which is also included a second character, to represent a cipher, if prefered.

Signs of numerals consist, secondly, of marks made as in the case of dots, and particularly represented on the annexed drawing marked Example 1, Mode 2.

Signs of numerals consist, thirdly, of characters drawn at measured distances in the shape of the teeth of a common saw by the use of a pencil or any instrument for marking. The points corresponding to the teeth of a saw are in number to correspond with the numeral desired to be represented, as in the case of dots or marks in the other modes described, and as particularly represented in the annexed drawing marked Example 1, Mode 3.

Signs of numerals consist, fourthly, of dots and lines separately and conjunctively used as follows, the numerals 1, 2, 3, and 4 being represented by dots, as in Mode 1, first given above: The numeral 5 is repesented by a line equal in length to the space between the two dots of any other numeral; 6 is represented by the addition of a dot to the line representing 5; 7 is represented by the addition of two dots to said line; 8 is represented by prefixing a dot to said line; 9 is represented by two dots prefixed to said line; and 0 is represented by two lines, each of the length of said line that represents the number 5; said signs are particularly set forth in the annexed drawings, marked Example 1, Mode 4.

Either of said modes are to be used as may be preferred or desired and in the method hereinafter described.

The sign of a distinct numeral, or of a compound numeral when used in a sentence of words or of numerals, consists of a distance or space of separation between the characters of greater extent than the distance used in separating the characters that compose any such distinct or compound numeral. An illustration of this sign is particularly exhibited in the annexed drawing marked Example 2.

Signs of letters consist in variations of the dots, marks, and dots and lines, and spaces of separation of the same formation as compose the signs of numerals, varied and combined differently to represent the letters of the alphabet in the manner particularly illustrated and represented in the annexed drawing marked Example 3.

The sign of a distinct letter, or of distinct words, when used in a sentence, is the same as that used in regard to numerals and described above.

Signs of words, and even of set phrases or sentences, may be adopted for use and communication in like manner under various forms, as convenience may suggest.

The type for producing the signs of numerals consist, first, of fourteen pieces or plates of thin metal, such as type-metal, brass, iron, or like substances, with teeth or indentations upon one side or edge of ten of said type, corresponding in number to the dots or punctures or marks requisite to constitute the numerals respectively heretofore described in the system of signs, and having also a space left upon the side or edge of each type, at one end thereof, without teeth or indentations, corresponding in length with the distance or separation desired between each sign of a numeral. Another of said type has two indentations, forming thereby three teeth only, and without any space at either end, to correspond with the size of a cypher, as heretofore described by reference to Example 1, Modes 1, 2, 3, of drawings in said system of signs. One other of said type is without any indentation on its side or edge, and being in length to correspond with the distance or separation desired between distinct or compound numerals, and with the sign heretofore described for that purpose. One of the remaining two of said type is formed with one corner of it beveled, (system of type, Example 4, Fig. 1,) and is called a "rest," and the other is in a pointed form and called a "stop."

Each of said type is particularly delineated on the annexed drawing marked Example 4, Fig. 1, and numbered or labeled in accordance with the purpose for which they are designed respectively, and are used, in like manner, for producing each of the several signs of numerals heretofore described in the system of signs.

The type for producing the signs of numerals consist, secondly, of five pieces or plates of metal first described above, four of which are the same as are numbered 1, 2, 3, and 4 in the annexed drawing marked Example 4, Fig. 1, and the fifth one being the same as is denominated in the same example "the long space," and heretofore alluded to; also, of six other pieces or plates of said metal, varied in indentations and teeth and spaces, as represented on the annexed drawings marked Example 4, Fig. 2, to produce signs of the denominations described in the fourth mode of the before-mentioned system of signs, Example 1.

The type for producing the signs of letters are of the same denomination with those used in producing signs of numerals, and only varied in form, from one to twenty-three, as exhibited in the annexed drawing marked Example 5.

The type for producing both signs of numerals and signs of letters are adapted for use to either a straight rule, called the "straight port-rule," and are in that case made straight lengthwise, as described in the drawings annexed and heretofore referred to in Example 5, or to a circular port-rule, in which case they are lengthwise circular or formed into sections of a circle, as represented in the drawings annexed marked Example 6, Figs. 2 and 3, and as will be further understood by the descriptions hereinafter contained of the straight and circular port-rules. On the under side of the type for the circular port-rule (which type are of greater thickness than those for the straight port-rule) is a groove (system of type, Example 6, A in Figs. 1 and 3) about midway of their width, and in depth about half the thickness aforesaid, and extending from the space ends, as B, Example 6, Fig. 3—that is, the ends without indentation—of said type, along the length, and conforming to the curve thereof, to a point, D D, equal in distance from the opposite ends to half the width of the pointed teeth cut upon their edges. For a delineation of these type reference is made to sections thereof in Figs. 1 and 3 upon the annexed drawings marked Example 6.

The type-cases are wood, or of any other material, with small compartments of the exact length of the type, for greater convenience in distributing, and resembling those in common use among printers.

The type-rules are of wood or metal, or other material that may be preferred, and about three feet in length, with a groove, into which the type, when used, are placed. On the under side of each type-rule are cogs, by which they are adapted to a pinion-wheel having corresponding cogs and forming part of a port-rule. The type-rule in use is moved onward as motion is given to the said wheel. A delineation of the type-rule is contained in the annexed drawing marked Example 7.

The straight port-rule consists of a pinion-wheel, before mentioned, turned by a hand-crank attached to a horizontal screw that plays into the cogs of the pinion-wheel as the latter do into the cogs of the type-rule, or by any other power in any of the well-known methods of mechanism. It is connected with a railway or groove, in and by which the type-rule, from the motion imparted to it by said wheel, is conveyed in a direct line beneath a lever that breaks and connects the galvanic circuit in the manner hereinafter mentioned. A delineation of said wheel, crank, and screw is contained in the drawings hereunto annexed marked Example 8, Figs. 1, 2, 3.

The circular port-rule is a substitute, when preferred, for both the type-rule and the straight port-rule, and consists of a horizontal or inclined wheel, Example 9, Fig. 1, A, of any convenient diameter, of wood or metal, having its axis connected on the under side of the wheel, with a pinion-wheel, K, and as in the case of the straight port-rule. It is moved by the motion of the pinion-wheel, as is the type-rule in the former description. On the entire circumference of said horizontal or inclined wheel, and upon its upper surface, is a shoulder or cavity, a, Figs. 1, 2, corresponding in depth with the thickness of the type used, and in width, b, equal to that of the type, exclusive of their teeth or indentations. Near the outer edge of the surface of said shoulder or cavity are cogs c, throughout the circumference of the wheel, projecting upward at a distance from each other equal to one-half of the width of the teeth or indentations of the type, and otherwise corresponding in size to the width and depth of the groove D D, Fig. 4, in the under side of the circular type before described and illustrated by reference to Example 6, Figs. 1 and 3. Directly over said shoulder or cavity and cogs, and at one or more points on the circumference of said wheel, is extended from a fixture outside of the orbit of the wheel a stationary type-feeder, E, Fig. 1, formed of one end, e, and one side, E, perpendicular, of tin or brass plate or other substance, and of interior size and shape to receive any number of the type which are therein deposited with their indentations projecting outward, as in Fig. 2, and their grooves downward, as in Fig. 4. Said type-feeder is so suspended from its fixture F F over the shoulder or cavity of the wheel A, before described, as to admit of the passage under it of said wheel in its circuit as near the bottom of the feeder as practicable, without coming in contact therewith. The type deposited in the feeder as before mentioned form a perpendicular column, as in Fig. 2, the lower type of which rests upon the surface of the before-named shoulder of the wheel b, Fig. 2, and the cog of the wheel, projecting upward, enters the groove D D, Fig. 4, of the type hereinbefore described.

The operation of said circular port-rule in regulating the movement of the type in sue is as follows: When the wheel A is set in motion the type resting immediately upon the shoulder of the wheel, in the manner mentioned above, as in Fig. 2, is carried forward on the curvature of the wheel from beneath the column of type resting upon it in the stationary type-feeder by means of one of the before-named cogs coming in contact with that point D, Fig. 3, Example 6, in the groove of the type, hereinbefore described as forming the termination of said groove, and which is particularly delineated at the points D D in the annexed drawings, marked Example 6, Fig. 3. As by said process the lower type in the column that is held by the stationary feeder is carried forward and and removed, the next type settles immediately upon the shoulder of the wheel, and, after the manner of the removed type, is brought in contact with another cog of said shoulder within the groove of the type, and thence carried forward from beneath the incumbent column, as was its predecessor. Then follows consecutively in the same method each type deposited within the feeder so long as the wheel is kept in motion. The deposit of the type in the stationary feeder is regulated by the order in which the letters or numerals or words they represent are designed to be communicated at any distant point or points. After the type are respectively carried forward on the curvature of the wheel in the manner stated above, beyond the point where they are acted upon by the signal-lever, as is hereinafter described, they are lifted, each in its turn, from the shoulder of the wheel A and cast off into a box or pocket, G, below the wheel by means of a slender shaft or spindle, H, made of any metal, and resembling in form a common plow-share, extending downward from a fixture, o, placed outside of the wheel, into a groove, K, within the before-named shoulder of said wheel A, and on the inner side of the cogs c, already described. By means of said groove the downward point of said shaft or spindle H is brought within the curvature and below the surface of said shoulder b, Fig. 2, and consequently under the approaching end of the type, so that each type successively, as it is carried forward on said curvature, in the manner before described, is lifted from the shoulder and forced upward on the inclined shaft or spindle by the type in contact with it at the other end until turned off into the before-named box or pocket G below, ready for a redistribution.

For a more particular delineation of the several parts of said circular port-rule reference is made to the annexed drawings marked Example 9, Figs. 1 and 2.

The signal-lever, Example 9, Fig. 3, consists, first, for use with the straight port-rule, Example 8, Fig. 1, A, of a strip of wood of any length from six to twenty-four inches, resting upon a pivot, a, or in a notched pillar formed into a fulcrum by a metal pin, a, passing through it and the lever. At one end of the lever a metallic wire, bent to a semicircular or half-square form, as at A, or resembling the prongs of a fork distended, is attached by its center, as described in the annexed drawings, Example 8, at the point marked A. Between said end of the lever and the fulcrum a, and near the latter, on the under side of the lever A, is inserted a metallic tooth or cog, b, curved on the side nearest to the fulcrum, and in other respects corresponding to the teeth or indentations upon the type already described. On the opposite extremity of the lever is a small weight, C, to balance or offset, in part, when needed, the weight of the lever on the opposite side of the fulcrum. The lever thus formed is stationed directly over the railway or groove D D, heretofore described as forming a connected part of the straight port-rule. The movement of the type-rule brings the tooth of each type therein set in contact with the tooth or cog of the lever, and thereby forces the lever upward until the points of the two teeth in contact have passed each other, when the lever again descends as the teeth of the type proceeds onward from the tooth of the lever. This operation is repeated as frequently as the teeth of the type are brought in contact with the tooth of the lever. By thus forcing the said lever upward and downward the ends of the semicircular or pronged wire are made alternately to rise from and fall into two small cups or vessels of mercury, E E, in each of which is an end or termination of the metallic circuit-conductors, first described above. This termination of the metallic circuit in the two cups or vessels breaks and limits the current of electricity or galvanism through the circuit; but a connection of the circuit is effected or restored by the falling of the two ends of the pronged wire A attached to said lever into the two cups, connecting the one cup with the other in that way. By the rising of the lever, and consequently the wire upon its end, from its connection with said cups, said circuit is in like manner again broken, and the current of electricity or galvanism destroyed. To effect at pleasure these two purposes of breaking and connecting said circuit is the design of said motion that is imparted in the before-mentioned manner to said lever, and to regulate this motion, and reduce it to the system of intelligible signs before described, is the design and use of the variations in the form of the type, also before described. A plate of copper, silver, or other conductor connected with the broken parts of said circuit of conductors, and receiving the contact of the wire attached to said lever, may be substituted, if preferred, for said cups of mercury. For a particular delineation of the several parts of said lever, reference is made to the annexed drawing marked Example 8.

The signal-lever consists, secondly, for use with the circular port-rule, Example 9, Fig. 3, of a strip of wood, G, with a metallic wire, A, at one end, of the form and for the purposes of the lever already described above. It turns on a pivot or fulcrum, a, placed either near the middle or in the end of the lever. At the end of the lever, at C, opposite to the metallic wire A, an elbow, c, is formed on a right angle with the main lever, and extending downward from the level with the pivot or fulcrum sufficiently for a metallic tooth, H, in the end thereof, corresponding with the teeth or indentations of the type, already described, to press against the type projecting from the shoulder or cavity of the wheel A, Fig. 1, that forms the circular port-rule, before described. Said wheel is placed beneath the said lever, as seen at G, Fig. 1, in a position to be reached by the extremity or tooth H of the arm of the lever just mentioned. The tooth H in the arm of the lever is kept in constant contact with the type of the circular port-rule by the pressure of a spring, B, upon it, as described in the annexed drawings marked Example 9, at B. Figs. 1 and 3 in the same example exhibit sections of the said lever. The action thus produced by the contact of the teeth of the type in the port-rule, when said wheel is in motion, with the tooth in the arm of the lever, lifts up and drops down the opposite extremity, A, of said lever, having the metallic wire upon it, as the tooth of said lever passes into or out of the indentations of the type, and in the same manner and to the same effect as the first-described lever rises and falls, and accordingly breaks and closes the circuit of conductors, as in the former instance. In the use of this circular port-rule and its appropriate lever, Fig. 3, type may be used having the points of their teeth and their indentations shaped as counterparts or reverses to those delineated in the annexed drawings heretofore referred to and marked Examples 4, 5, and 6, and thereby the forms of the recorded signs will be changed in a corresponding manner.

Figure 4:
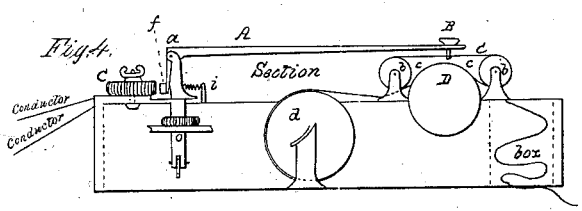

The register consists, first, of a lever of the shape of the lever connected with the circular port-rule above described, and is delineated in the annexed drawings marked Example 10, Figs. 1, 2, and 4, at A. Said lever A operates upon a fulcrum, a, that passes through the end that forms the elbow a, upon the lower extremity of which, and facing an electro-magnet, is attached the armature of a magnet, f. In the other extreme of the lever, at, B is inserted one or more pencils, fountain-pens, printing-wheels, or other marking-instruments, as may be seen in the Fig. 4 of the example last mentioned, at letter B. The magnet is at letter C in the same figure.

Secondly, of a cylinder or barrel of metal or wood, and covered with cloth or yielding coating, to turn upon an axis and occupying a position directly beneath the pencil, fountain-pen, printing-wheel, or other marking-instrument to be used, as exhibited in the last-mentioned example of drawings, Fig. 4, D. Two rollers, marked b b in said figure of drawings, are connected with said cylinder, on the upper-side curvatures thereof, and being connected with each other by two narrow bands of tape passing over and beneath each, near the ends thereof, and over the intervening surface of the cylinder, in a manner to cause a friction of the bands of tape upon the latter when in motion, as delineated in the last-named example, Fig. 4, at points marked c c c. The distance between said bands of tape on the rollers is such as to admit of the pencil, or other marking instrument in the lever, to drop upon the intervening space of the cylinder. Near by said cylinder is a spool to turn on an axis, and marked $d$ in the said figure, to receive any desired length of paper or other substance formed into slips or a continuous ribbon, and for the purpose of receiving a record of the signs of intelligence communicated. When the register is in motion one end of the paper on said spool being inserted between the under surfaces of said two rollers, under the strips of tape that connect them and the cylinder, it is drawn by the friction or pressure thus caused upon it forward from said spool gradually, and passed over said cylinder, and is thence deposited in a box on the opposite side, or is cut off at any desired length as it passes from the cylinder and rollers.

Figure 5:
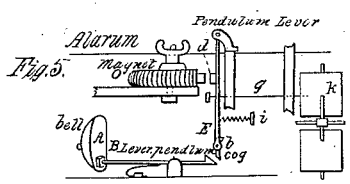

Thirdly, of an alarm-bell, A, Example 10, Fig. 5, which is struck by means of a lever-hammer, B, that is acted upon by a movable cog, $b$, placed upon an axis or pin, $b$, that confines it in the lower extremity of a pendulum-lever, (marked E in Fig. 5 of Example 10,) having an armature of a magnet attached to it at $d$, and acted upon by an electro-magnet, $o$, placed near it and the before-named magnet, and in the same circuit of conductors with the latter. Said cog $b$ moves in a quarter-circle only, as the motion of said arm of the lever passes backward and forward in the act of recording, as hereinafter described. When forced into a horizontal position in said quarter-circle it ceases to act upon the hammer; but when moved from a perpendicular position it presses upon the projection in the end of the hammer, causing the opposite end of the hammer to be raised, from which elevation it again falls upon a stationary bell, A, as soon as said cog reaches a horizontal position, and ceases, as before mentioned, to press upon the hammer. Thus a notice, by sound or an alarm, is given at the point to which intelligence is to be communicated as soon as the register begins to act, and such sound may be continued or not, at pleasure, for the purpose mentioned or for any other uses, as the hammer shall be suspended or not from contact with the bell, or with any number of bells that may be employed. Fig. 5 of said example, marked 10 in the annexed drawings, represents sections of said hammer and bell.

Said several parts of the register are set in motion by the communication to or action upon the before-named armature of a magnet, attached to the lever of the register, of the electric or galvanic current in the circuit of conductors, and from an electro-magnet in said circuit, as before described, stationed near the said armature. As said armature is drawn or attracted from its stationary and horizontal position toward the said magnet when the latter is charged from the circuit of conductors, said lever is turned upon its fulcrum, and the opposite end thereof necessarily descends and brings the pen, or marking-instrument which it contains in contact with the paper or other substance on the revolving cylinder directly beneath it. As said armature ceases to be thus drawn or attracted by said magnet, as is the case as soon as said magnet ceases to be charged from the circuit of conductors, or as the current in said circuit is broken in the manner hereinbefore described, the said armature is forced back by its own specific gravity, or by a spring or weight, as may be needed, to its former position, and the pen or marking-instrument in the opposite end of the lever is again raised from its contact with the paper or other substance on the before-named revolving cylinder. This same action is communicated simultaneously from the same circuit of conductors to as many registers as there are corresponding magnets provided within any circuit and at any desired distances from each other.

The cylinder and its two associate rollers are set in motion simultaneously with the first motion of the lever by the withdrawal of a small wire or spindle, $g$, Example 10, Figs. 2 and 5, from beneath one branch of a fly-wheel, $k$, that forms a part of the clock machinery hereinafter named. Said wire $g$ is withdrawn by the action upon said wire of a small electro-magnet, $o$, Figs. 2 and 5, stationed in the circuit and near the large magnet before named, as delineated in Fig. 5 of Example 10. Said cylinder and rollers are subsequently kept in motion by a train of wheels similar to common clock-wheels, as in Figs. 2 and 3, acted upon by a weight, raised as occasion may require by a hand-crank, and their motion is regulated by the same wheels to correspond with the action of the registering-pen or marking-instrument. Said train is represented in Figs. 1, 2, and 3 of said Example 10.

The electro-magnet thus used is made in any of the usual modes, such as winding insulated copper wire, or strips of copper, or tin-foil, or other metal around a bar of soft iron, either straight or bent into a circular form, and having the two extremities of the coils connected with the circuit of conductors, so that the coils around the magnet make part of the circuit.

To extend more effectually the length of any desired circuit of conductors, and to perpetuate the power of the electric or galvanic current equally throughout the same, I adopt the following mode, and also for connecting and using any desired number of additional and intervening batteries or generators of said current, and for connecting progressively any number of consecutive circuits, viz: Place at any point in a circuit an electro-magnet of the denomination already described, with an armature upon a lever of the form and structure, and in the position of that used at the register to hold and operate the marking-instrument, with only a substitution therein for such marking-instrument of a forked wire, A, Example 9, Fig. 3, like that upon the end of the signal-lever heretofore described. Directly beneath the latter wire place two cups of mercury, E E, or two metallic plates joined to terminations of a circuit leading from the fresh or additional battery or generator of said circuit in the same manner as they are to be provided in the first circuit of conductors at the points where the cups of mercury are hereinbefore described. As the current in the first circuit acts upon the magnet thus provided the armature thereof and lever are thereby moved to dip the forked wire A into the cups of the second circuit, as in the circuit first described. This operation instantly connects the break in said second circuit, and thus produces an additional and original power or current of electricity or galvanism from the battery of said second circuit to the magnet or magnets placed at any one or more points in such circuit, to be broken at pleasure, as in the first circuit; and from thence by the same operation the same results may again be repeated, extending and breaking at pleasure such current through yet another and another circuit, *ad infinitum*, and with as many intervening registers for simultaneous action as may be desired, and at any distances from each other.

The dictionary or vocabulary consists of words alphabetically arranged and regularly numbered, beginning with the letters of the alphabet, so that each word in the language has its telegraphic number, and is designated at pleasure, through the signs of numerals.

The modes which I propose of insulating the wires or other metal for conductors, and of laying the circuits, are various. The wires may be insulated by winding each wire with silk, cotton, flax, or hemp, and then dipping them into a solution of caoutchouc, or into a solution of shellac, or into pitch or resin and caoutchouc. They may be laid through the air, inclosed above the ground, in the ground, or in the water. When through the air they may be insulated by a covering that shall protect them from the weather, such as cotton, flax, or hemp, and dipped into any solution which is a non-conductor, and elevated upon pillars. When inclosed above the ground they may be laid in tubes of iron or lead, and these again may be inclosed in wood, if desirable. When laid in the ground they may be inclosed in iron, leaden, wooden, or earthen tubes, and buried beneath the surface. Across rivers the circuit may be carried beneath the bridges, or, where there are no bridges, inclosed in lead or iron, and sunk at the bottom, or stretched across, where the banks are high, upon pillars elevated on each side of the river.

What I claim as my invention, and desire to secure by Letters Patent, is as follows:

1. The formation and arrangement of the several parts of mechanism constituting the type-rule, the straight port-rule, the circular port-rule, the two signal-levers, and the register-lever, and alarm-lever, with its hammer, as combining respectively with each of said levers one or more armatures of an electro-magnet, and as said parts are severally described in the foregoing specification.

2. The combination of the mechanism constituting the recording-cylinder, and the accompanying rollers and train-wheels, with the formation and arrangement of the several parts of mechanism, the formation and arrangement of which are claimed as above, and as described in the foregoing specification.

3. The use, system, formation, and arrangement of type, and of signs, for transmitting intelligence between distant points by the application of electro-magnetism and metallic conductors combined with mechanism described in the foregoing specification.

4. The mode and process of breaking and connecting by mechanism currents of electricity or galvanism in any circuit of metallic conductors, as described in the foregoing specification.

5. The mode and process of propelling and connecting currents of electricity or galvanism in and through any desired number of circuits of metallic conductors from any known generator of electricity or galvanism, as described in the foregoing specification.

6. The application of electro-magnets by means of one or more circuits of metallic conductors from any known generator of electricity or galvanism to the several levers in the machinery described in the foregoing specification, for the purpose of imparting motion to said levers and operating said machinery, and for transmitting by signs and sounds intelligence between distant points and simultaneously to different points.

7. The mode and process of recording or marking permanently signs of intelligence transmitted between distant points, and simultaneously to different points, by the application and use of electro-magnetism or galvanism as described in the foregoing specification.

8. The combination and arrangement of electro-magnets in one or more circuits of metallic conductors with armatures of magnets for transmitting intelligence by signs and sounds, or either, between distant points and to different points simultaneously.

9. The combination and mutual adaptation of the several parts of the mechanism and system of type and of signs with and to the dictionary or vocabulary of words, as described in the foregoing specification.

In testimony whereof I, the said SAMUEL F. B. MORSE, hereto subscribe my name in the presence of the witnesses whose names are hereto subscribed, on the 7th day of April, A. D. 1838.

SAML. F. B. MORSE.

Witnesses:
B. B. FRENCH,
CHARLES MONROE.